(12) United States Patent
Donelson et al.

(10) Patent No.: US 8,033,775 B2
(45) Date of Patent: Oct. 11, 2011

(54) TRUCK MOUNTED BULK MATERIAL TRANSFER UNIT

(75) Inventors: Michael James Donelson, Springfield, MO (US); Terrence Christopher Donelson, Springfield, MO (US)

(73) Assignee: Donelson Construction Co., LLC, Clever, MO (US)

( * ) Notice: Subject to any disclaimer, the term of this patent is extended or adjusted under 35 U.S.C. 154(b) by 767 days.

(21) Appl. No.: 11/284,574

(22) Filed: Nov. 22, 2005

(65) Prior Publication Data

US 2007/0031227 A1  Feb. 8, 2007

Related U.S. Application Data

(60) Provisional application No. 60/705,909, filed on Aug. 5, 2005.

(51) Int. Cl.
 *B65G 21/10* (2006.01)
(52) U.S. Cl. .......... 414/502; 198/312
(58) Field of Classification Search .......... 414/502, 414/503, 505, 501, 504; 198/313, 312, 311, 198/315, 314, 316.1, 317, 318
See application file for complete search history.

(56) References Cited

U.S. PATENT DOCUMENTS

| | | | | |
|---|---|---|---|---|
| 1,310,454 A * | 7/1919 | Stuart | | 198/360 |
| 1,764,019 A | 6/1930 | Hardenbergh | | |
| 2,005,442 A | 6/1935 | Spiegl | | |
| 3,782,536 A * | 1/1974 | Toney | | 198/316.1 |
| 3,945,484 A * | 3/1976 | Oury | | 198/313 |
| 4,345,680 A * | 8/1982 | Kay | | 198/304 |
| 4,624,357 A | 11/1986 | Oury et al. | | |
| 4,813,526 A | 3/1989 | Bëlanger | | |
| 4,981,204 A * | 1/1991 | Smith | | 198/313 |
| 5,042,240 A * | 8/1991 | Rocca et al. | | 56/16.6 |
| 5,178,253 A | 1/1993 | Fix | | |
| 5,297,665 A | 3/1994 | Smith | | |
| 5,553,968 A * | 9/1996 | Campbell | | 404/108 |
| 5,588,947 A * | 12/1996 | Studer et al. | | 588/252 |
| 5,846,022 A | 12/1998 | Grundl | | |
| 5,984,077 A * | 11/1999 | Frye et al. | | 198/317 |
| 6,283,269 B1 * | 9/2001 | Mayer | | 198/313 |
| 6,302,265 B1 * | 10/2001 | Cunningham | | 198/632 |
| 6,305,896 B1 * | 10/2001 | Szentimery | | 414/502 |
| 6,588,572 B2 | 7/2003 | Lischynski et al. | | |
| 6,604,620 B2 | 8/2003 | Dennis | | |
| 6,606,844 B2 * | 8/2003 | Dillon et al. | | 56/14.6 |
| 6,688,450 B2 | 2/2004 | Speers et al. | | |
| 6,705,449 B2 * | 3/2004 | Wagstaffe | | 198/313 |
| 6,845,859 B2 * | 1/2005 | Grundl | | 198/314 |
| 7,108,125 B2 * | 9/2006 | Gilmore et al. | | 198/812 |
| 2004/0067125 A1 | 4/2004 | Dillon | | |
| 2004/0173435 A1 | 9/2004 | Vogelgesang et al. | | |
| 2006/0239806 A1 * | 10/2006 | Yelton | | 414/502 |

OTHER PUBLICATIONS http://www.knightsfab.com/photogallery.asp; Knight's Fabrication and Welding of Eugene, Oregon; Knight's Fabrication & Welding, Inc.; 2 pages, (Last visited on Apr. 18, 2005).

* cited by examiner

*Primary Examiner* — Joshua Rudawitz

(74) *Attorney, Agent, or Firm* — Armstrong Teasdale LLP

(57) ABSTRACT

A material transfer unit is described that includes a truck, a hopper configured for mounting proximate a rear of the truck, and a conveyor comprising a catch section, a head section and a conveyor belt extending therebetween. The catch section is configured for placement under the hopper and the head section is configured for placement proximate a front of the truck. The head section is further configured for movement with respect to the truck for placement of transferred material.

31 Claims, 6 Drawing Sheets

TRUCK MOUNTED BULK MATERIAL TRANSFER UNIT

This application claims the benefit of U.S. provisional patent application Ser. No. 60/705,909 filed Aug. 5, 2005 which is incorporated herein by reference in its entirety.

BACKGROUND OF THE INVENTION

This invention relates generally to handling of bulk materials, and more specifically to a truck mounted material transfer unit.

Bulk material handling machines, for example, material transferring units that handle materials utilized in the surfacing of roadways, are typically capable of transferring only onboard material. In addition, these transferring units typically do not provide a capability to elevate and redistribute material into locations that are generally inaccessible to standard trucks. Further, such bulk material handling machines are typically of such a size that they cannot be legally driven along a roadway.

BRIEF DESCRIPTION OF THE INVENTION

In one aspect, a material transfer unit is provided that comprises a truck, a hopper configured for mounting proximate a rear of the truck, and a conveyor. The conveyor comprises a catch section, a head section and a conveyor belt extending therebetween. The catch section is configured for placement under the hopper and the head section is configured for placement proximate a front of the truck. The head section is further configured for movement with respect to the truck for placement of transferred material.

In another aspect, a method for transferring materials is provided. The method comprises putting the materials into a hopper, the hopper extendible from a rear of a truck, dropping the materials from the hopper onto a catch section of a conveyor, conveying the materials towards a front of the truck using the conveyor, adjusting a position of a head end of the conveyor, the head end of the conveyor extending from the front of the truck, and conveying the materials off the head end of the conveyor.

DETAILED DESCRIPTION OF THE INVENTION

Figure 1:
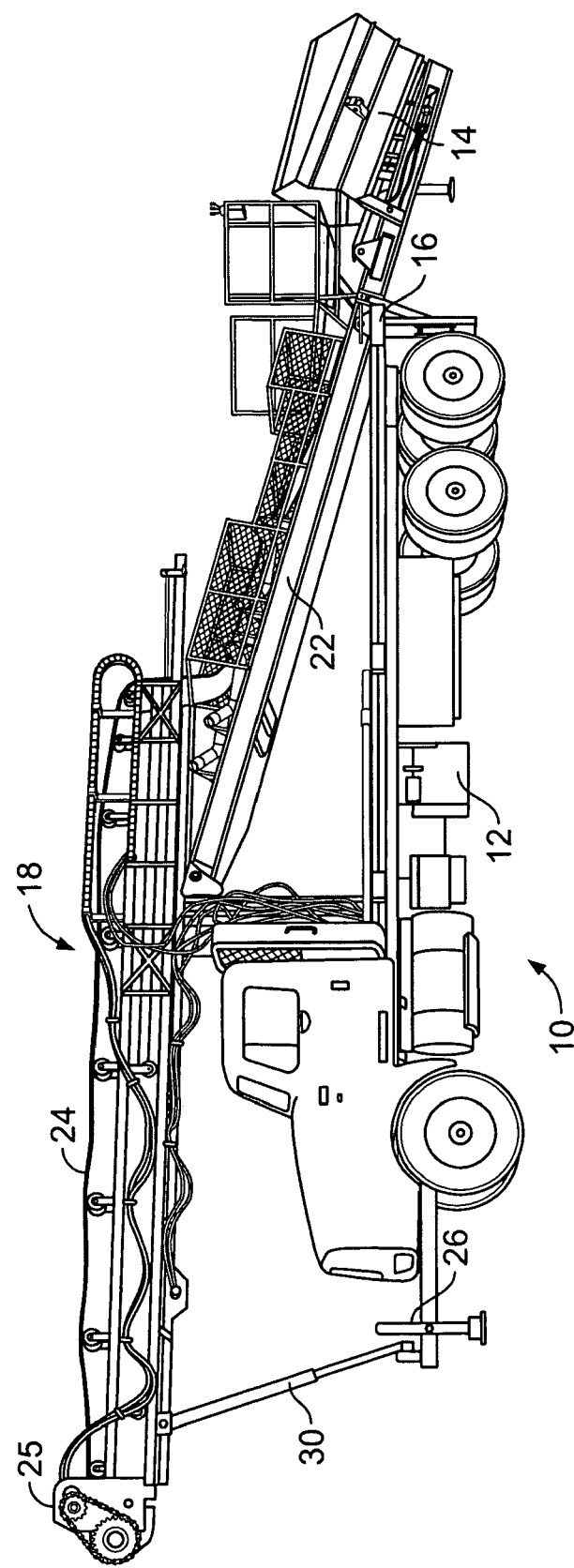
FIG. 1 is a side view of a truck mounted material transfer unit.

FIG. 1 is a side view of a truck mounted material transfer unit 10. Material transfer unit 10 includes a truck 12, for example, a dual rear axle flatbed truck. In addition, material transfer unit 10 includes a hopper 14 that is configured to be mounted proximate a rear 16 of truck 12, and a conveyor 18 that further includes a catch section 22 and a head section 24.

As illustrated in FIG. 1, conveyor 18 includes a length between catch section 22 and head section 24. A portion of catch section 22 is configured for placement under hopper 14, and a head end 25 of head section 24 is configured for placement proximate a front 26 of truck 12. An extendible and retractable bar 30 attaches head section 24 to front 26 of truck 12. Bar 30, at least in part, allows for the up and down movement of head end 25 of head section 24 with respect to truck 12 for precise placement of transferred material. In one embodiment, extendible and retractable bar 30 is hydraulically operated.

Material transfer unit 10 is capable of transferring material, for example, materials utilized in road construction, from dump trucks and trailers, or from other loading devices, directly into inaccessible locations or into other transport vehicles. Material transfer unit includes a capability to operate as a continuous flow transfer unit. In addition and as described below in further detail, the unit 10 also has the ability to elevate and redistribute material in locations that standard trucks cannot access. Unlike some known transfer machines that only transfer onboard material, material transfer unit 10 acts a continuous flow connection between material delivery and material placement and/or redistribution functions.

Figure 2:
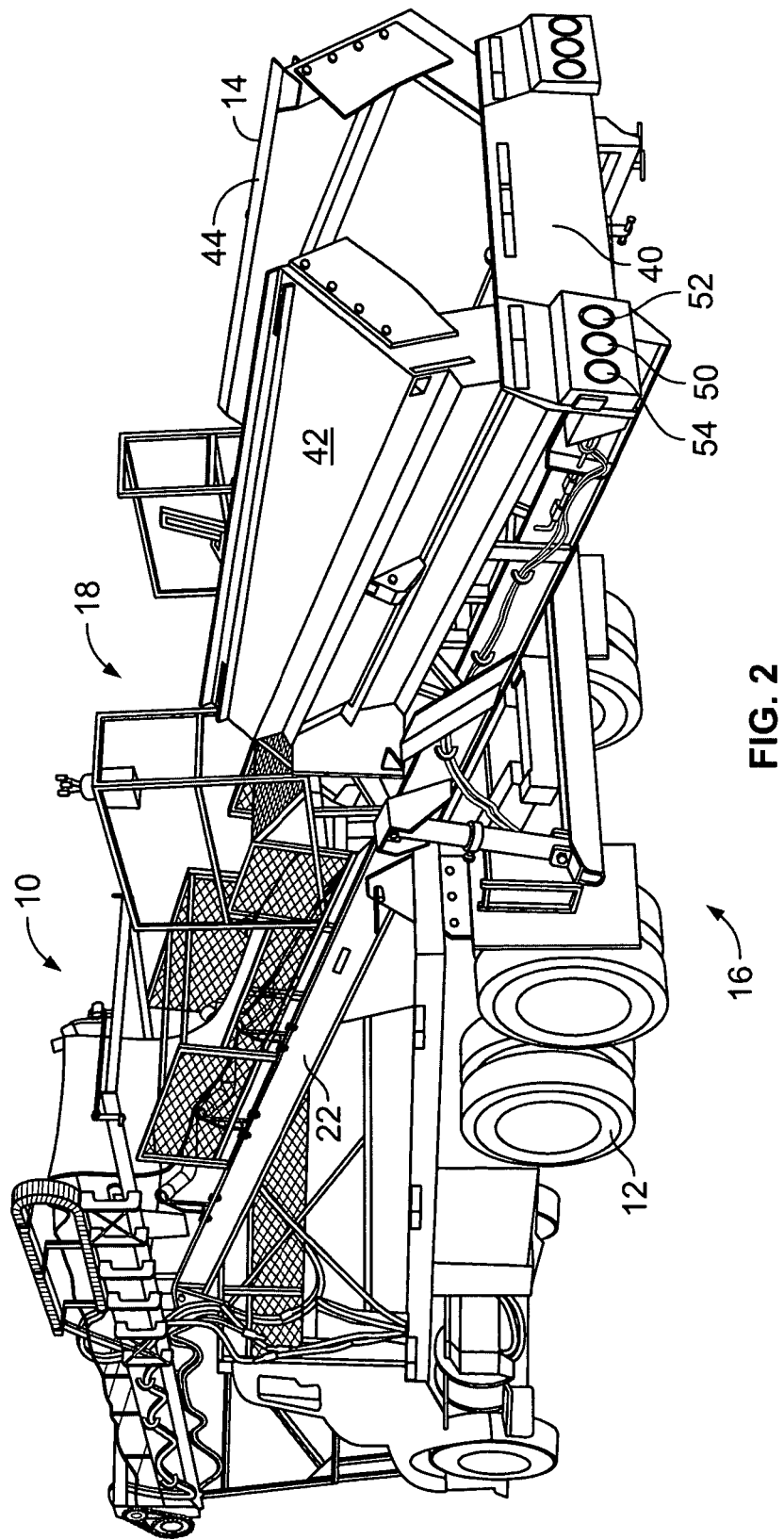
FIG. 2 is a view illustrating a rear of a hopper and a conveyor for the material transfer unit of FIG. 1.

FIG. 2 is a rear view of hopper 14. In the embodiment illustrated, hopper 14 is a foldable unit that includes a center section 40 and left and right folding members 42 and 44 respectively. Hopper 14 is foldable for a variety of reasons, including that folding allows material transfer unit 10 to be reduced in width such that it may be legally transferred on roadways. Folding of hopper 14 also helps to ensure that hopper 14 is emptied completely. Tail lights 50, backup lights 52, and turn signals 54 are installed on a rear of hopper 14 so that material transfer unit 10 may be legally transported on roadways. In use, trucks and trailers are capable of dumping their loads of material into hydraulically folding hopper 14 mounted on rear 16 of truck 12.

A rear of conveyor 18 (along with hopper 14) is capable of being raised hydraulically, in the illustrated embodiment, into a proper travel position. For utilization of conveyor 18 and hopper 14, hopper 14 and catch section 22 are lowered hydraulically from the travel position and into a proper position for use as further shown and described herein.

Figure 3:
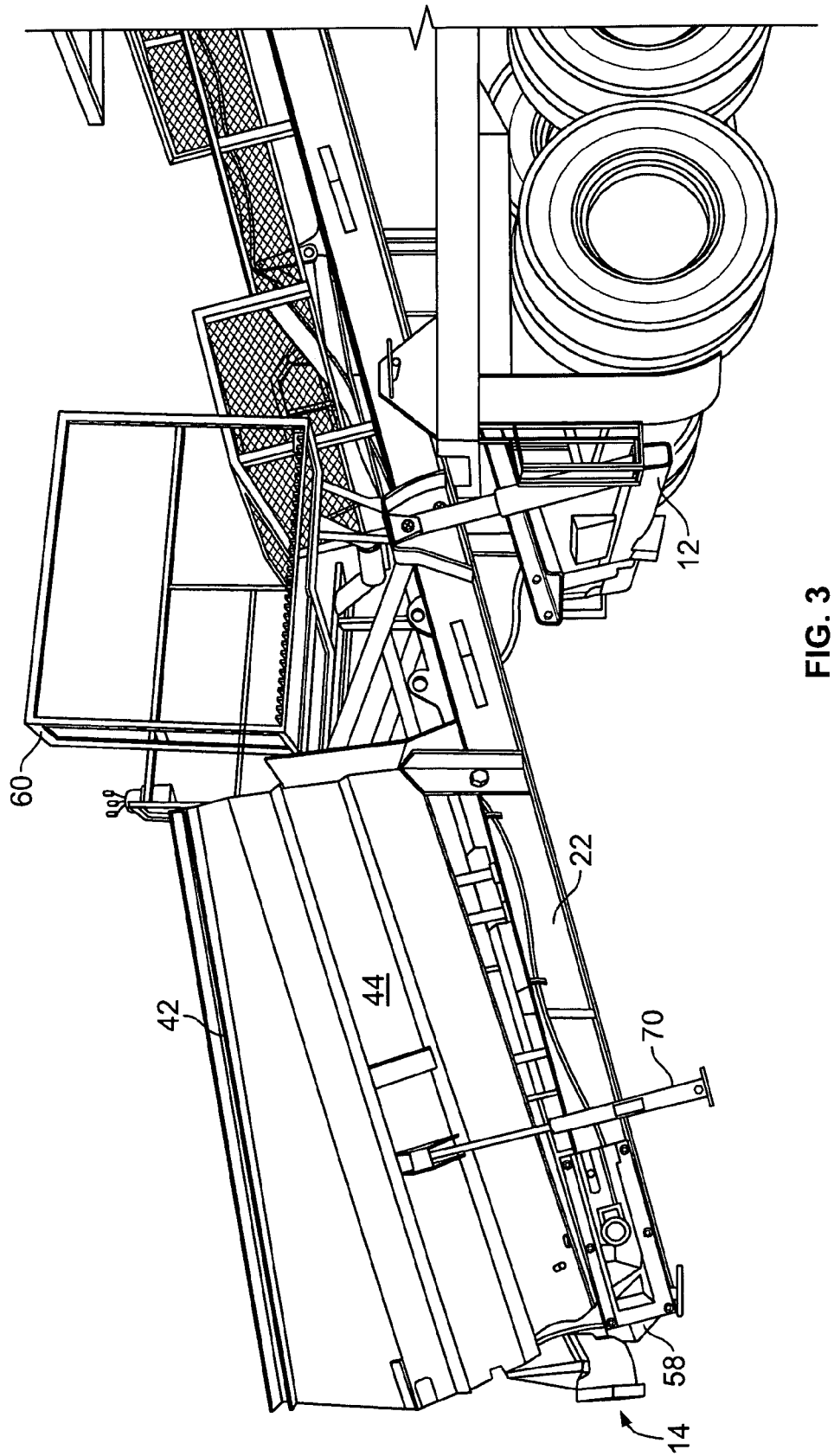
FIG. 3 is a side view of the hopper and a catch section of the conveyor for the material transfer unit of FIG. 1.

Referring now to FIG. 3, extending under dump hopper 14 is a catch portion 58 of catch section 22 about which is a continuous conveyor belt (not shown in FIG. 3). In a specific embodiment, the conveyor belt is about 42 inches wide. Incorporation of a conveyor (e.g., conveyor 18 shown in FIG. 1) of such a width allows for both a high volume capacity and a wider "catch" of material being dumped into hopper 14. For example, a standard dump truck dumps its load across about a nine foot width. Hopper 14, in an expanded position, is capable of "catching" a load of such a width from, for example, a dump truck. Also shown in FIG. 3 are an operators station 60, which includes controls for the above and below mentioned hydraulics and conveyor. In certain embodiments, material transfer unit 10 is configured with more than one operator station 60. A hydraulic actuator 70 is also shown which is attached to right folding member 44 of hopper 14 to control movement between the folded and expanded positions of hopper 14.

Figure 4:
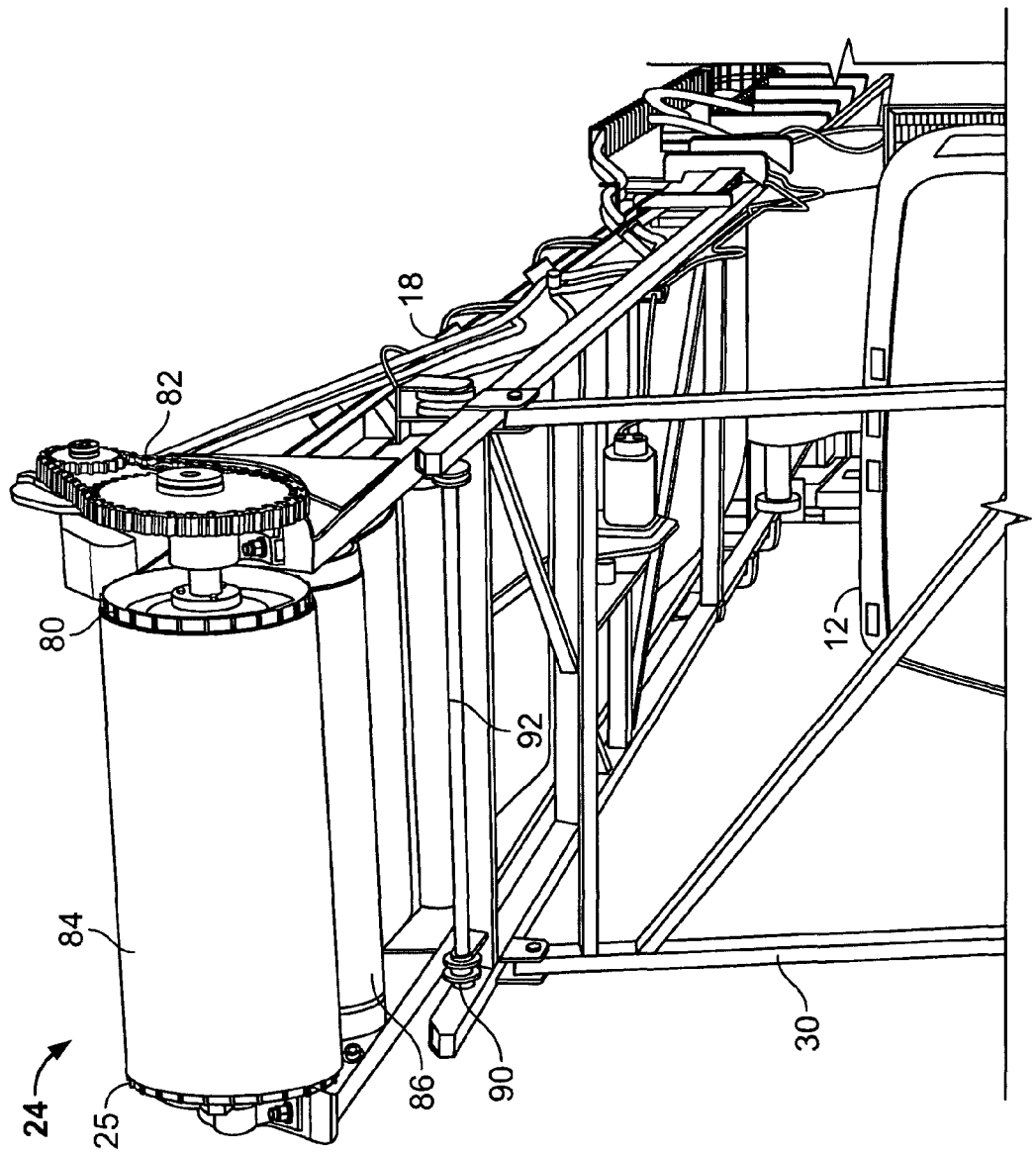
FIG. 4 is a front view of a head section of the conveyor for the material transfer unit of FIG. 1.

FIG. 4 is a front view of head end 25 of head section 24 of conveyor 18. A conveyor drive pulley 80, which is sometimes referred to as a head pulley, is hydraulically driven through a gear reduction mechanism 82 to maintain the torque required to move the desired amount of bulk materials. An operator can hydraulically adjust the speed of a conveyor belt 84 from any of the above mentioned operator stations 60. For example, slower operation speeds may be needed for careful placement of material, while faster speeds can be utilized to obtain needed production capacity. Under head pulley 80 is mounted a snubber pulley 86 which is positioned and utilized to maintain an amount of contact between conveyor drive pulley 80 and conveyor belt 84. Utilization of snubber pulley 86, along with the configuration of dump hopper 14 with respect to conveyor belt 84, allows for a no slip startup of material transfer unit 10 when it is under a load.

As described above with respect to the operation of extendible and retractable bar 30, head end 25 of head section 24 of conveyor 18 can be hydraulically raised or lowered for proper placement elevation. More specifically and in one embodiment, hydraulic stabilizers 90 are mounted on the front of truck 12 to stabilize and level conveyor 18 to allow conveyor belt 84 to track properly on support idlers or rollers 92.

This upper conveyor section (e.g., head section 24) is hydraulically retractable into a position for travel. Head section 24 is also hydraulically extendable and head end 25 of head section 24 can further be moved up and down based on operation of extendible and retractable bar 30 which provides for a range of positions for use. In alternative embodiments, conveyor 18 is configured to be utilized when both head section 24 and catch section 22 are fully retracted into the travel positions as well as when fully extended and points therebetween.

Figure 5:
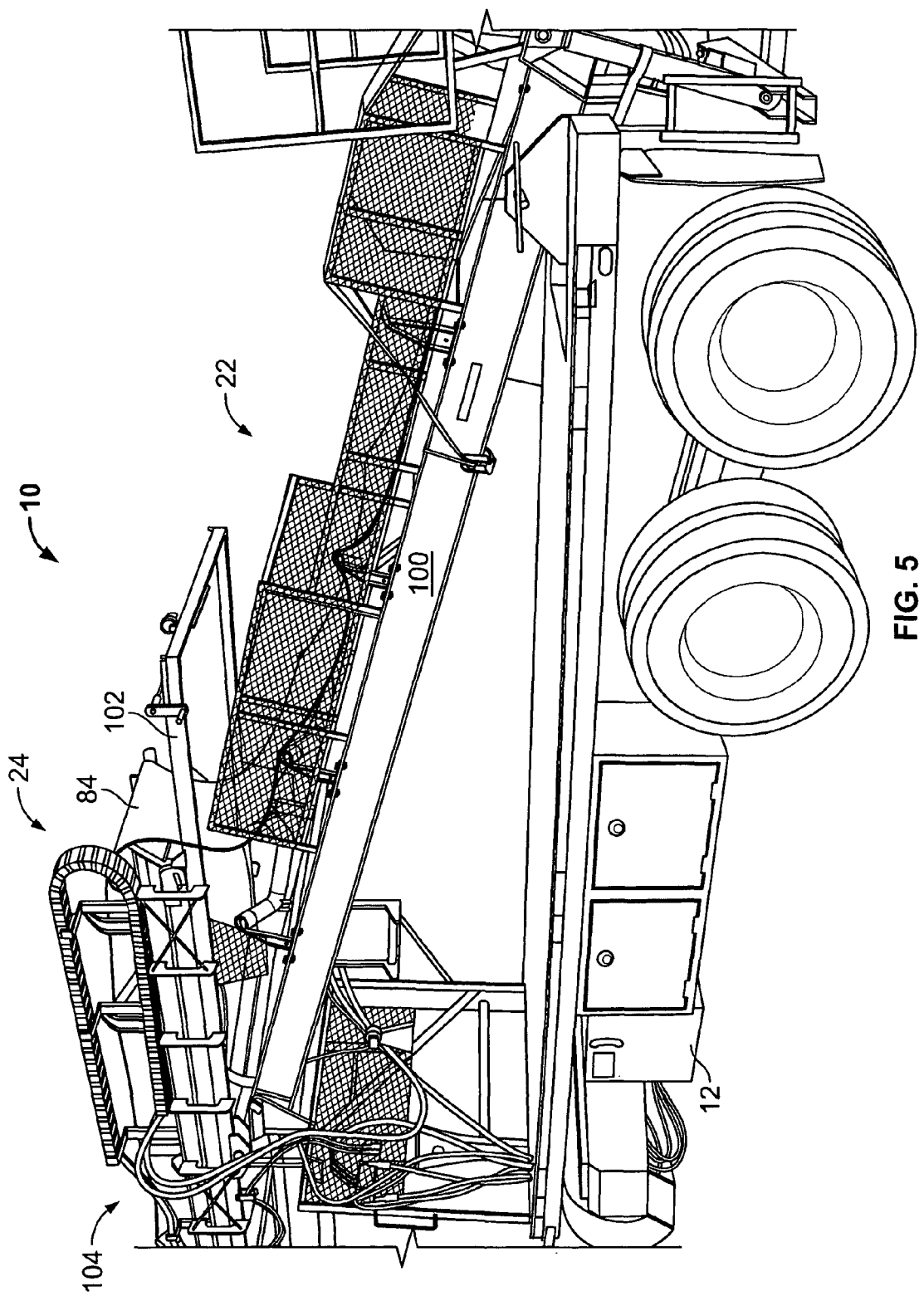
FIG. 5 is a side view illustrating an interconnection between the head section and catch section of the conveyor.

Referring now to FIG. 5, it is further illustrated that catch section 22 and head section 24 are separate units that are movable with respect to one another. More specifically, catch section 22 includes a frame 100 that is in a sliding engagement with a frame 102 of head section 24. A hydraulic system is operated from an operator's station 104 to control the positions of frames 100 and 102 with respect to one another. FIG. 5 illustrates frames 100 and 102 in a position for travel. At a time when it is desired to operate material transfer unit 10, the operator utilizes the operator's station 104 to cause frame 102 to move forward (towards a front of truck 12) and frame 100 to move toward a rear of truck 12. This operation causes conveyor belt 84 to be in a position and condition to transfer material from hopper 14 (not shown in FIG. 5) to a head end (not shown in FIG. 5) of head section 24. Rails 110 are included along the sides of catch section 22 to minimize an amount of materials that falls from conveyor 18 as the material is conveyed from hopper 14 to the head end.

Figure 6:
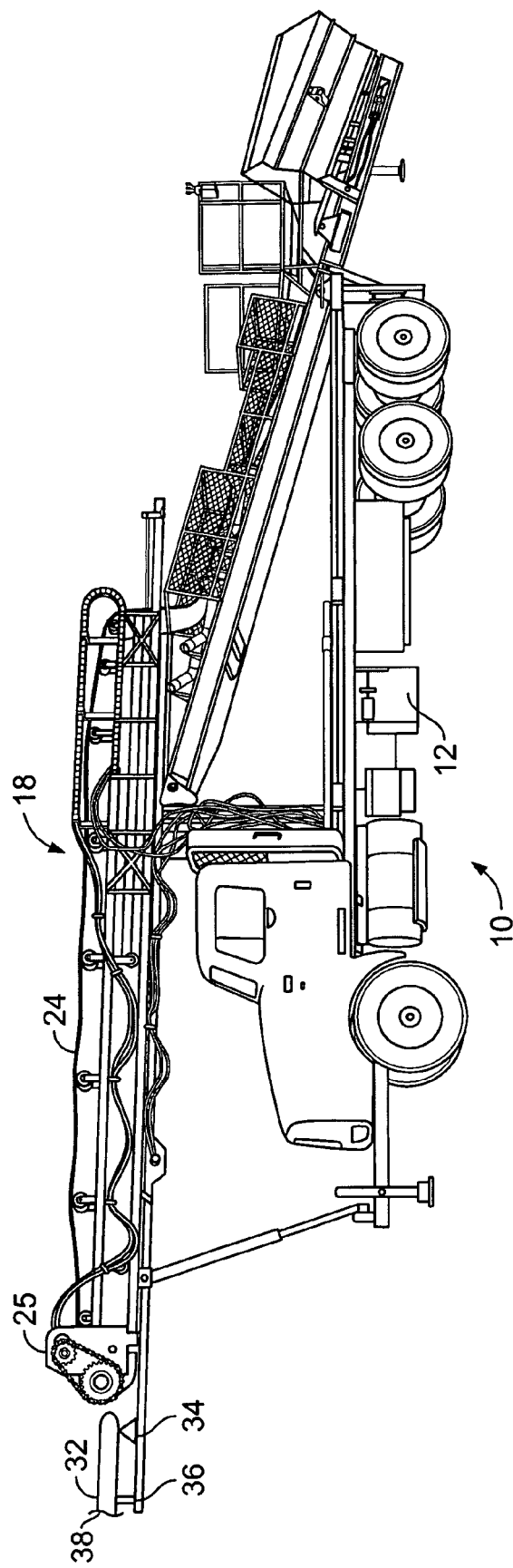
FIG. 6 illustrates an alternative embodiment of material transfer unit that includes a second conveyor configured to extend from the front of the truck.

FIG. 6 illustrates an alternative embodiment of material transfer unit 10 that includes a second conveyor 32 configured to extend from the front of the truck 12. While not illustrated in FIG. 6, second conveyor 32 is capable of being moved into a travel position. In one embodiment, for travel, second conveyor 32 is moved into a position substantially parallel to, and underneath, conveyor 18. For use, secondary conveyor 32 is hydraulically extended from under the head end 25 of head section 24 and is configured to catch, and subsequently convey, materials as they are conveyed from the head end 25. The secondary conveyor 32 is further configured with swivel attachments 34 and is able to rotate, or pivot in an arc. In such an embodiment materials that are falling from the head end 25 of conveyor 18, may be directed to locations, for example, that are far to the left and right of the front of truck 12. Second conveyor 32, in addition to the above described ability to change a lateral position of end 38 of second conveyor 32 remote from head end 25 of conveyor 18, further includes an ability to adjust a height of end 38 of second conveyor 32, which helps increase the efficiency of the delivery of materials. In various embodiments, hydraulics 36 are utilized to change a height and a lateral position of end 38 of the second conveyor 32 remote from head end 25 of conveyor 18. Further hydraulics may be utilized when removing, and subsequently restoring, the second conveyor 32 to the above described travel position.

The above described material transfer unit 10 embodiments are completely portable and self-contained and powered, truck-mounted material transfer units that are legally transportable down roadways. In a retracted position, unit 10 is of a legal hauling height and width. In an extended position, unit 10 allows for trucks and trailers to dump their loads of material into a hydraulically folding hopper 14 that is mounted to extend from a rear end of truck 12 which allows for the efficient movement of bulk materials, for example, the kind of materials utilized in the surfacing and resurfacing of roadways.

While the invention has been described in terms of various specific embodiments, those skilled in the art will recognize that the invention can be practiced with modification within the spirit and scope of the claims.

What is claimed is:
1. A material transfer unit comprising:
a truck;
a first conveyor mounted to said truck and comprising a catch section, a head section and a single conveyor belt extending therebetween, said head section slidably engageable with said catch section, said catch section proximate a rear of said truck, said head section proximate a front of said truck, said head section movable in a first direction with respect to said truck and away from the rear of said truck for placement of transferred material forward of said truck, movement of said head section operable for deployment of said conveyor belt;
a hopper mounted proximate a first end of said catch section such that said hopper is movable with respect to the rear of said truck, said hopper operable for placing material on said single conveyor belt proximate said first end of said catch section; and
a hydraulic system configured to raise said catch section of said first conveyor and said hopper for travel along a roadway and lower said catch section and said hopper into a position for receipt of material into said hopper and onto said single conveyor belt via said hopper.

2. A material transfer unit according to claim 1 wherein said hopper is configured to be folded to a width such that a width of said material transfer unit is approximately equal to or less than a width of said truck.

3. A material transfer unit according to claim 1 wherein said hopper comprises tail lights and turn signals.

4. A material transfer unit according to claim 1 wherein said first conveyor comprises a belt and a conveyor drive pulley, said conveyor drive pulley configured to be hydraulically driven utilizing gear reduction.

5. A material transfer unit according to claim 4 further comprising a snubber pulley, said snubber pulley positioned to maintain an increased amount of contact between said belt and said drive pulley.

6. A material transfer unit according to claim 1 further comprising hydraulic stabilizers mounted to a front of said truck to stabilize and level said first conveyor.

7. A material handing unit according to claim 1 wherein to configure said head section for movement with respect to said truck, said unit comprises a second hydraulic system configured to retract said head section for travel of said truck and extend said head section from said truck into a position for use.

8. A material handing unit according to claim 1 comprising at least one operator station configured to allow an operator to adjust a speed of said conveyor.

9. A material handling unit according to claim 1 wherein said conveyor belt has a width of about 42 inches.

10. A material transfer unit according to claim 1 further comprising a second conveyor, said second conveyor configured to extend from said truck, said second conveyor configured to be moveable to and from a travel position.

11. A material transfer unit according to claim 10 wherein the second conveyor is configured to catch and convey materials as the materials fall from a head end of said head section of said first conveyor.

12. A material transfer unit according to claim 10 wherein said second conveyor further comprises at least one swivel attachment configured to rotate and pivot the second conveyor.

13. A material transfer unit according to claim 10 wherein said second conveyor further comprises an end remote from said head end of said first conveyor when said second conveyor is extended from said truck.

14. A material transfer unit according to claim 13 wherein a height and lateral position of said second conveyor are adjustable.

15. A material handling unit according to claim 1 wherein said catch section is movable in a second direction with respect to said truck, said first direction opposite said second direction.

16. A material handling unit according to claim 15 wherein movement of said catch section and said head section in opposite directions is operable for deployment of said conveyor belt therebetween.

17. A material transfer system comprising:
- a wheeled unit operable on a roadway, said wheeled unit comprising an elongated base collinear with a longitudinal axis;
- a conveyor mounted on said elongated base, said conveyor generally aligned along the longitudinal axis of said wheeled unit, said conveyor comprising:
  - a rear section;
  - a front section; and
  - a single belt operatively extending between said front section and said rear section, said front section slidably engaged with said rear section and movable in a first direction with respect to said rear section for placement of transferred material, movement of said front section away from said rear section operable for deployment of said single belt therebetween;
- a hopper mounted proximate a rear end of said rear section for placement of materials onto said single belt proximate said rear end; and
- a hydraulic system configured to raise said rear section and said hopper for travel along a roadway and lower said rear section and said hopper into a position for receipt of material into said hopper and onto said single conveyor belt via said hopper.

18. A material transfer system according to claim 17 wherein at least one of said hopper and said wheeled unit comprises tail lights and turn signals.

19. A material transfer system according to claim 17 wherein said conveyor comprises a conveyor drive pulley operatively attachable to said single belt, said conveyor drive pulley configured to be hydraulically driven utilizing gear reduction.

20. A material transfer system according to claim 19 further comprising a snubber pulley operatively attached to said single belt to maintain an increased amount of contact between said single belt and said drive pulley.

21. A material transfer system according to claim 17 further comprising hydraulic stabilizers mounted proximate a front of said wheeled unit to stabilize and level said front section of said conveyor.

22. A material transfer system according to claim 17 wherein to configure said head section for movement with respect to said truck, said unit comprises a second hydraulic system configured to retract said head section for travel of said truck and extend said head section from said truck into a position for use.

23. A material transfer system according to claim 17 comprising at least one operator control for adjusting a speed of said conveyor.

24. A material transfer system according to claim 17 wherein said single belt has a width of about 42 inches.

25. A material transfer system according to claim 17 wherein said front section and said rear section are slidably engageable with one another to define a travel configuration for said material transfer system.

26. A material transfer system according to claim 17 wherein said front section and said rear section are slidably disengaged with one another to operatively extend said single belt and define a use configuration for said material transfer system.

27. A material transfer system according to claim 17 further comprising a second conveyor operable to extend forward of said wheeled unit to define a use position such that materials may be received from said single belt.

28. A material transfer system according to claim 27, said second conveyor operable to retract from the use position to define a travel position.

29. A material transfer system according to claim 28 wherein said second conveyor further comprises at least one swivel attachment connected thereto operable for rotation and pivoting of the second conveyor with respect to said longitudinal axis.

30. A material transfer system according to claim 27 wherein a height and lateral position of said second conveyor are adjustable.

31. A material transfer system comprising:
- a wheeled unit for movement of said system along a roadway, said wheeled unit comprising an elongated base collinear with a longitudinal axis;
- a conveyor mounted on said elongated base, said conveyor generally aligned along the longitudinal axis of said wheeled unit, said conveyor comprising:
  - a rear section;
  - a front section; and
  - a single belt operatively extending between said front section and said rear section, said front section movable in a first direction with respect to said wheeled unit for placement of transferred material, said rear section movable in a second direction with respect to said wheeled unit, said first direction opposite said second direction, movement of said front section and said rear section away from one another operable for deployment of said single belt therebetween, said front section and said rear section slidably engageable with one another to define a travel configuration for said material transfer system; and
- a hopper mounted for movement along with said rear section, proximate a rear end of said rear section for placement of materials onto said single belt proximate said rear end.

* * * * *